R. S. SMITH AND T. HANSEN.
METHOD OF AND BLANK FOR PRODUCING VEHICLE FRAME PARTS.
APPLICATION FILED MAY 17, 1920.
1,433,161.
Patented Oct. 24, 1922.
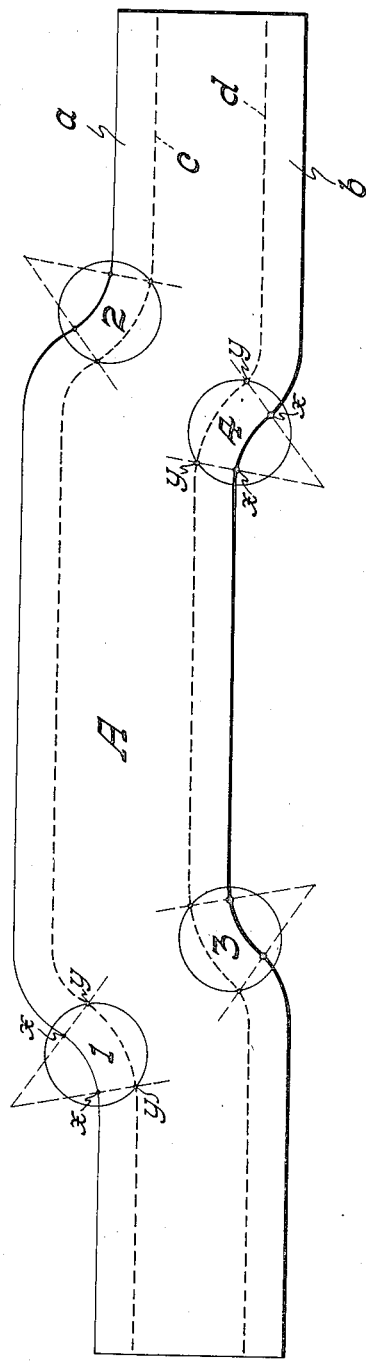
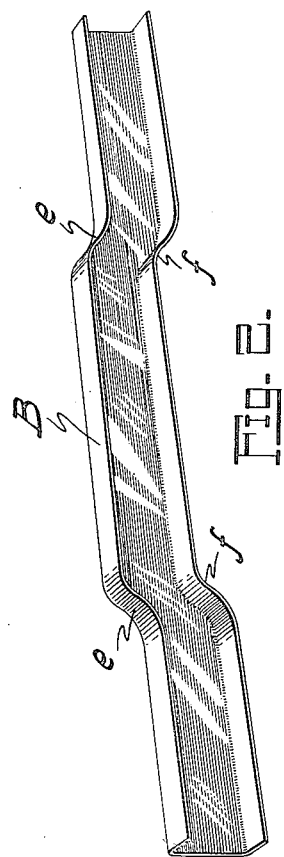
WITNESS
INVENTORS
R. Stanley Smith
and Thorvald Hansen.
BY
Erwin, Wheeler & Woolard
ATTORNEYS Patented Oct. 24, 1922.

1,433,161

UNITED STATES PATENT OFFICE.

REUBEN STANLEY SMITH AND THORVALD HANSEN, OF MILWAUKEE, WISCONSIN, ASSIGNORS TO A. O. SMITH CORPORATION, OF MILWAUKEE, WISCONSIN, A CORPORATION OF NEW YORK.

METHOD OF AND BLANK FOR PRODUCING VEHICLE-FRAME PARTS.

Application filed May 17, 1920. Serial No. 381,876.

*To all whom it may concern:*

Be it known that we, REUBEN STANLEY SMITH and THOVALD HANSEN, citizens of the United States, and residing in the city of Milwaukee, county of Milwaukee, State of Wisconsin, have invented a certain new and useful Improvement in Methods of and Blanks for Producing Vehicle-Frame Parts; and we do declare the following to be a clear, complete, and exact description thereof, such as will enable others skilled in the art to which our invention pertains to use the same, reference being had to the accompanying drawing for an illustration of the manner in which our invention may be reduced to practice.

The invention relates particularly to a method of producing the curved, flanged side-bars and cross-bars for automobile frames, and while for purposes of disclosure the invention will be shown and described in connection with the production of a crossbar, such invention will be understood as having a general application, and as not limited specifically to the subject-matter shown.

The channeled side and cross-bars of an automobile frame are drawn from rolled sheet steel blanks, the gauge of which is determined by the maximum load which the automobile is designed to carry. The construction of an automobile usually necessitates the employment of curved cross-bars, so as to provide a clearance space for the arrangement of the longitudinal shaft and its connected parts, as well as other parts, in the assembled automobile frame. The arched construction embodied in the said curved cross-bars contributes also to the strength of the frame structure.

In producing a curved side or cross-bar for an automobile frame, a blank of irregular contour is punched from a rolled strip or plate or steel. The blank thus formed is subjected to the action of the dies of a drawing press, by means of which the side margins of the blank are turned or folded so as to stand in planes which are perpendicular to the plane of the central portion or web of the blank. In thus forming the side or cross-bar from the blank, such crossbar is reinforced in its horizontal and vertical cross sections, and the required rigidity is imparted thereto.

In a long experience in connection with the manufacture of automobile frames, we have encountered considerable difficulty in forming the concave portions of the flanges of a side or cross bar, such difficulty residing in the tendency of the flanges to tear apart in forming such concave portions in the drawing operation, due to the limitations upon the elasticity of the cold metal. The difficulty adverted to has not been encountered in forming straight sheet metal bars, or the straight sections of curved bars, in which there is no stretching of the metal; nor has it appeared in forming the convex flanges of like bars, in which compression of the metal takes place during the drawing operation.

After much study of the problem, we have discovered that the difficulty is traceable to the initial operation of punching the blanks from the rolled strips or plates of steel, and that in such punching operation there occurs a slight molecular disturbance in the metal adjacent the lines upon which the punch operates, which molecular disturbance produces a crystallization in the metal of the blank along the said lines. This disturbance, although imperceptible, manifests itself when an attempt is made to stretch the metal in the manner which occurs in the formation of the concave flanges. The crystallization of the molecular structure of the blank caused by the punching operation destroys the integrity and continuity of the metal upon the edges of the blank, and weakens the structure of the edge of the blank to the extent that it presents a ready starting point for a tear, when the metal of that particular portion of the flange is subjected to the tensional stress which occurs in the operation of forming such concave flange.

Our invention involves a treatment of local areas of the metal blank whereby the molecular disturbance and the consequent crystallization complained of are removed from the concaved portions thereof, and the integrity of the edges of the blank structure in such portions is restored, so that the concave flanges may be turned without encountering the difficulty hereinbefore mentioned.

Formerly the difficulty referred to was surmounted by subjecting the whole of the blank to an annealing operation, which eliminated the crystalline structure created in the punching operation and served to reunite and make uniform the disturbed molecular condition of the edges of the blank, so that the annealed blank would have its elastic limits increased, and the concaved flanges thereon could be successfully drawn into shape without injury thereto. But this practice of annealing the entire blank is objectionable in that the heat treatment to which the blank is subjected in the annealing operation serves to soften the whole of the blank, and thus destroy the initial rigidity and stiffness residing in the metal strip or plate as it comes from the rolling mill. It is very desirable that this quality of rigidity and stiffness in the blank be retained, inasmuch as it serves to resist the bending strains to which the cross-bar is sometimes subjected in the operation of an automobile in the frame of which such cross-bar is incorporated as a structural part.

In the development of our work, we have found it to be unnecessary to anneal the entire blank in order to change the molecular construction thereof to a state which will permit the conversion of the blank into a curved, flanged side-bar having concave portions, and have discovered that most satisfactory results may be achieved by annealing only those marginal zones or areas of the blank which are to constitute the curved flanges. This local annealing of the areas of the blank in which the concave flanges are formed, completely removes the crystalline structure created within those areas by the punching operation, but does not disturb the main portion of the blank, so that the original rigidity and stiffness residing in the metal sheet is preserved. The annealing referred to permits the margins of the blank to be stretched to the extent desired, to form the concave flanges in the drawing operation, without weakening the structure of the completed cross-bar, or imparing in any material degree the rigidity thereof.

While in the foregoing we have described our invention as pertaining to the formation of concave flanges in a cross-bar, it will be understood that the invention is applicable to the formation of angular flanges, such as exist in certain types of cross-bars, and which are produced by the convergence of two contour lines. In the formation of the angular flange, the problem outlined, namely, the stretching of the metal, is present in an enlarged degree. The concave flanges and the angular flanges are equivalents within the scope of our invention.

Our invention resides also in the elements produced by the practice of our improved method.

The features of novelty residing in our invention will be pointed out in the appended claims.

Referring to the accompanying drawing, Figure 1 is a plan view of a sheet metal blank, which may have any desired contour, and intended to be drawn into shape to produce a curved, flanged side-bar for an automobile or other vehicle frame, the figure indicating diagrammatically the manner in which our invention is applied in practice.

Fig. 2 is a perspective view of a completed curved, flanged cross-bar, produced in accordance with our invention, and having convex and straight as well as concave flanges.

In Fig. 1 of the drawing, the letter A indicates a sheet metal blank so contoured as to permit the production therefrom of a curved cross-bar of desired form for an automobile frame. The longitudinal side lines of the said blank are indicated by the letters $a$ and $b$. The broken lines $c$ and $d$ indicate the parallel lines upon which the margins are turned by the action of the dies of a drawing press, so as to form flanges which throughout their length stand perpendicularly to the plane of the web of the blank. The blank illustrated is shown as offset at its middle portion from the longitudinal center line of the blank, such offset being provided for the creation of the arch or clearance space existing in the completed side bar B, and shown in Fig. 2, for the accommodation of parts of the automobile, as well as strengthening the frame by reason of the arched construction. The concave portions of the flanges of the sidebar are indicated by the letters $e$ and $f$, in Fig. 2.

Referring to Fig. 1, it will be seen that the segments numbered 1, 2, 3 and 4, in the margins of the blank, constitute the portions of the blank which are to form the concave sections of the flanges. In the drawing operation the said segmental portions, together with the other marginal portions defined by the broken lines $a$—$c$ and $b$—$d$, are turned from the plane of the blank. The radial dotted lines defining the segments, indicate the extent of the lengthwise displacement which takes place in the edges of the segments in turning the concave flanges. In the drawing operation, the outer edge of each segment of the blank on the lines $a$ and $b$ between the points $x$—$x$, must be expanded to a length equal to that of the segment on the broken lines $c$ and $d$, between the points $y$—$y$. The degree of expansion of the metal between the points $x$—$x$ is such that the material will be subjected to a severe strain at the points mentioned, with consequent liability to tear the metal or so weaken it as to create an element of danger, if the blank be pressed without annealing. But if the whole blank be annealed, in accordance with the present practice, the cross-bar loses its initial rigidity, and is subject to bending strains which may develop in the operation of the automobile or other vehicle, in the frame of which the cross bar is embodied as a structural element. It is not feasible to temper the cross bar which has been drawn from an annealed blank.

As stated in the opening of this specification, the present practice of annealing the entire blank so as to destroy the crystallization produced by the molecular displacement in the edges of the blank caused by the punching operation, and soften the material thereof to permit free flowing movement of the metal, has enabled the blank to be drawn without injury to the structure thereof, but the practice referred to has the very serious drawbacks hereinbefore adverted to. In practicing our new method, we make a local application of heat to the blank in the zones or areas of the segments referred to, and indicated by the circular lines about the numerals 1, 2, 3 and 4. We thus eliminate the crystallization in the edges of the blank created in the punching operation, and soften the metal in those zones only, so that the flanges may be turned and the blank drawn into shape, without being subjected to strains which would tear the blank at the points where the concave flanges are formed, or weaken the structure thereof, as in the case where the blank is drawn without annealing. By thus locally annealing the blank, we are enabled in the main to preserve its original rigidity, which is a result very much to be desired. The crystallization created in those portions of the flanges which are to form the convex and straight sections does not ordinarily constitute a defect, and need not be removed by treatment, unless desired.

The manner of applying the heat locally in the zones or areas described is not material to the present invention, although we have found it entirely practicable to apply such heat by means of an electric current, and convenient to automatically feed the blanks in rapid succession through the path which the said current traverses.

Our invention, therefore, resides in the process of forming a curved side or cross-bar of an automobile frame by the practice of a succession of operations, including the treatment of a suitably contoured metal blank in certain marginal areas so as to remove the crystallization produced in such areas by the dies of a punching press, and then turning the margin of the blank including the area thus treated into a curved flange.

Although we have shown and described our invention as pertaining particularly to the formation of the concave flanges of a cross-bar, we wish it understood that the invention contemplates also the formation of an angular flange upon such cross-bar. Some types of automobile frames use cross-bars in which the offset clearance is produced by the convergence of two lines, and in forming the flange at the apex of such convergence the metal is subjected to rather more than the usual strain. The formation of the angular flange referred to presents somewhat greater difficulties than those involved in the formation of the concave flange.

While we have herein described our invention as embodied in the operations stated, it will be understood that methods presenting other steps in the practice of which the elimination of the crystallization existing in the marginal zones or areas which are to form curved flanges is achieved, will be within the spirit and may be used without departing from the scope of our invention.

Having thus described our invention, what we claim and desire to secure by Letters Patent of the United States, is:

1. That method of making curved, flanged bars for automobile frames, which consists in providing a sheet metal blank with contour lines which are curved at points in their length, locally heat treating the said blank in the zone or area of the said curved lines to remove the crystallization therein caused by molecular displacement in the punching operation, without disturbing the initial rigidity of the main portion of the blank, and turning the side margins of the blank to form the flanges of the bar.

2. That method of making curved, flanged bars for automobile frames, which consists in providing a sheet metal blank with contour lines which are curved at points in their length, annealing the said blank in the zone or area of the said curved lines to eliminate the crystallization created in said zone or area by the punching operation, without disturbing the initial rigidity of the main portion of the blank, and turning the side margins of the blank to form the flanges of the bar.

3. That method of making curved, flanged bars for automobile frames, which consists in producing a sheet metal blank with curved contour lines at points in its length. locally heat treating the blank in the zone or area of the said curved lines to eliminate the crystalline structure of said zone or area, and at the same time preserve the initial rigidity of the main portion of the blank, and turning the margins of the blank to form the flanges of the bar.

4. That method of making curved, flanged bars for automobile frames, which consists in providing a sheet metal blank with curved contour lines at points in its length, locally annealing the blank in the zone or area of the said curved lines by means of an electric current to eliminate the crystalline structure of said zone or area induced in the forming operation of the blank and without disturbing the initial rigidity of the main portion of the blank, and turning the margins of the blank to form the flanges of the bar.

5. That method of forming flanges upon bars, which consists in providing a sheet metal blank with a curved contour line, heat treating the blank in the zone or area of the said curved line to remove the crystalline formation within said zone or area, without disturbing the initial rigidity of the blank as a whole, and then turning the margin of the blank in the treated area to form the flange.

6. That method of forming flanges upon bars, which consists in providing a sheet metal blank with a curved contour line, annealing the blank in the zone or area of the said curved line to remove the crystalline formation within said zone or area, without disturbing the initial rigidity of the blank as a whole, and then turning the margin of the blank in the annealed area to form the flange.

7. That method of forming flanged bars which consists in locally annealing certain zones or areas of a sheet metal blank so as to remove the crystalline structure within such zones or areas, without disturbing the initial rigidity of the blank as a whole, turning the margins of the blank to form flanges and simultaneously forming curved portions in the flanges in the zones or areas so treated.

8. That method of locally annealing curved metal blanks, which consists in punching out sheet metal blanks with concave contour lines and in heating the concave portions of such blanks to remove from the areas so treated the crystalline formation resulting from punching and without disturbing the structural formation of the portions of the body of the blank lying outside of the said areas so treated, whereby concave flanges may be turned upon the blanks without rupture of the metal in such concave portions.

9. A curved metal blank having concave contour lines designed for use in the production of a curved flanged bar, the said blank being locally annealed in the areas of the concaved portions thereof to remove the crystalline formation produced in such areas by punching out the contoured blank and without disturbing the structure of the body of the blank lying outside of the annealed areas, whereby the side margins of the blank may be turned to produce flanges without rupture of the metal in such concaved portions.

10. A flanged bar for automobile frames having curved flanges in the length thereof, and formed from a punched sheet metal blank which is heat treated in the region of the curved portions thereof and which retains its initial rigidity in the main portion thereof, and with the crystalline formation removed from the edges of the bar in the zone or area of the curved flanges.

11. An automobile frame comprising flanged side and cross bars, such bars having curved flanges in the length thereof formed from a punched sheet metal blank which is heat treated in the region of the curved portions thereof and which retains its initial rigidity in the main portion thereof, and with the crystalline formation removed from the edges of the bar in the zone or area of the curved flanges.

In testimony whereof, we have signed our names at Milwaukee, this 14th day of May, 1920.

R. STANLEY SMITH.
THORVALD HANSEN.

Witnesses:
W. F. WOOLARD,
MARGARET C. WOOLARD.